United States Patent [19]

Yoldas

[11] 4,225,635
[45] Sep. 30, 1980

[54] METHOD FOR APPLYING REACTED BORON OXIDE LAYER TO VITREOUS SILICA SUBSTRATE

[75] Inventor: Bulent E. Yoldas, Churchill Borough, Pa.

[73] Assignee: Westinghouse Electric Corp., Pittsburgh, Pa.

[21] Appl. No.: 16,765

[22] Filed: Mar. 2, 1979

[51] Int. Cl.² .............................................. B05D 3/02
[52] U.S. Cl. .................................... 427/106; 427/165; 427/169; 427/397.7
[58] Field of Search ............ 427/106, 165, 169, 372 A

[56] References Cited

U.S. PATENT DOCUMENTS

| | | | |
|---|---|---|---|
| 3,390,298 | 6/1968 | Werner | 313/220 |
| 3,407,327 | 10/1968 | Koury et al. | 313/229 |
| 3,679,385 | 7/1972 | Senet | 65/60 |

Primary Examiner—James R. Hoffman
Attorney, Agent, or Firm—W. D. Palmer

[57] ABSTRACT

Mercury metal-halide HID lamp having a discharge-sustaining filling comprising sodium halide and scandium halide is improved by providing a thin transparent layer comprising boron oxide adhered to and reacted with the exterior surface portion of the vitreous silica arc tube. Such a coating substantially inhibits migration of sodium ions through the arc tube. The coating also imparts devitrification resistance to any vibreous silica surface to which it is applied. The layer comprising boron oxide preferably is applied to the vitreous silica substrate by forming a clear, partially hydrolyzed solution principally comprising boron alkoxide and silicon alkoxide which is applied to the vitreous silica substrate. The substrate and applied solution are then heated to react the glass-forming constituents of the applied solution with the arc tube.

6 Claims, 2 Drawing Figures

METHOD FOR APPLYING REACTED BORON OXIDE LAYER TO VITREOUS SILICA SUBSTRATE

CROSS-REFERENCE TO RELATED APPLICATIONS

In copending application Ser. No. 931,346, filed Aug. 8, 1978 by Bulent E. Yoldas, the present applicant, and owned by the present assignee, is disclosed a method for forming anti-reflective films wherein specific relative amounts of metallic alkoxides, alcohol and water are mixed along with some mineral acid to produce clear solutions. These are applied to a predetermined thickness on the substrate to be coated, such as a silicon wafer as used in a solar cell. After the coating material is applied, the wafer is heated. The resulting coated silicon wafer has substantially decreased reflectivity for the energizing radiations for the solar cell.

BACKGROUND OF THE INVENTION

This invention relates to high-intensity-discharge lamps and a method for applying coatings comprising boron oxide to the surface of a vitreous silica substrate.

Mercury metal-halide high-intensity-discharge (HID) lamps are well known and have found wide application in area lighting and stadium lighting. In one embodiment of such lamps, the discharge-sustaining filling comprises mercury, sodium halide, and scandium halide, as taught in U.S. Pat. No. 3,407,327 dated Oct. 22, 1968 to Koury et al. When sodium halides are utilized in conjunction with a vitreous silica arc tube, there is a tendency for the sodium ions to migrate through the vitreous silica arc tube during prolonged operation of such lamps. Various constructions have been devised to minimize or inhibit such sodium ion migration and while these have achieved some degree of success, sodium ion migration through the vitreous silica arc tube remains a continuing problem.

U.S. Pat. No. 3,390,298 dated June 25, 1968 to Werner discloses vitreous silica lamp envelopes intended to operate at very high temperatures and which have provided on the interior surface thereof a coating comprising boron oxide, in order to inhibit so-called devitrification of the vitreous silica. Such coatings have been applied by wetting the inner surface of the envelope with a solution of one part glycerin and three parts trimethylborate, then heating the envelope and applied coating to a temperature of 1200° C. to 1300° C. for two hours in order to form a boric oxide-silica glass layer. The usual HID lamp is not, and frequently cannot, be heated to such an extreme temperature during its processing.

The problems encountered with the extra high-temperature heating step as taught in U.S. Pat. No. 3,390,298 are recognized in U.S. Pat. No. 3,679,385 dated July 25, 1972 to Sneft, which discloses an improved coating technique wherein inert gas in which the borating material, such as trimethylborate, is entrained and is then deposited on the inner surface of very heavy vitreous silica tubing prior to formation of the bulbous portion of the envelope. When the bulbous portion of the envelope is formed, the extremely high temperature required to soften vitreous silica to enable it to be formed also cause the deposited borating layer to react with the vitreous silica substrate.

SUMMARY OF THE INVENTION

The standard commercial mercury metal-halide HID lamp comprises a sealed elongated vitreous silica arc tube having electrodes operatively positioned therein proximate the ends thereof and enclosing a discharge-sustaining filling comprising mercury and inert ionizable starting gas plus sodium halide and scandium halide, such as the iodides. A light-transmitting outer envelope surrounds the arc tube and means is provided for supporting the arc tube within the outer envelope. A base is affixed to the outer envelope for connecting the lamp to a power source and lead-in conductor means are sealed through the outer envelope and the arc tube and electrically connect the lamp base to the lamp electrodes.

In accordance with the present invention, the lamp is improved by providing a thin transparent layer comprising boron oxide which is adhered to and reacted with the exterior surface portion of the arc tube. The reacted layer comprising boron oxide substantially inhibits migration of sodium ions through the arc tube during prolonged operation of the lamp, and the location of the reacted layer comprising boron oxide on the exterior surface of the arc tube protects this layer from reaction with scandium halide which is enclosed by the arc tube.

In the preferred method for applying the layer to the arc tube, which is equally applicable to any vitreous silica substrate, there is first formed a partially hydrolyzed, aqueous, clear solution principally comprising boron alkoxide and silicon alkoxide wherein the molar ratio of silicon alkoxide to a boron alkoxide is from 0.02 to 0.25. The formed solution is then applied to the surface of the vitreous silica substrate to be coated, and the substrate and applied coating are heated at a temperature of from about 500° C. to about 1100° C. for a sufficient period of time to liberate the hydroxyl and organic constituents of the coating and completely react the glass-forming residual constituents with the surface of the vitreous silica substrate. A significant advantage of this coating technique is that the coating can be applied over the exterior of fabricated arc tubes, without affecting arc tube components such as electrodes and discharge-sustaining materials.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENTS

Figure 1:
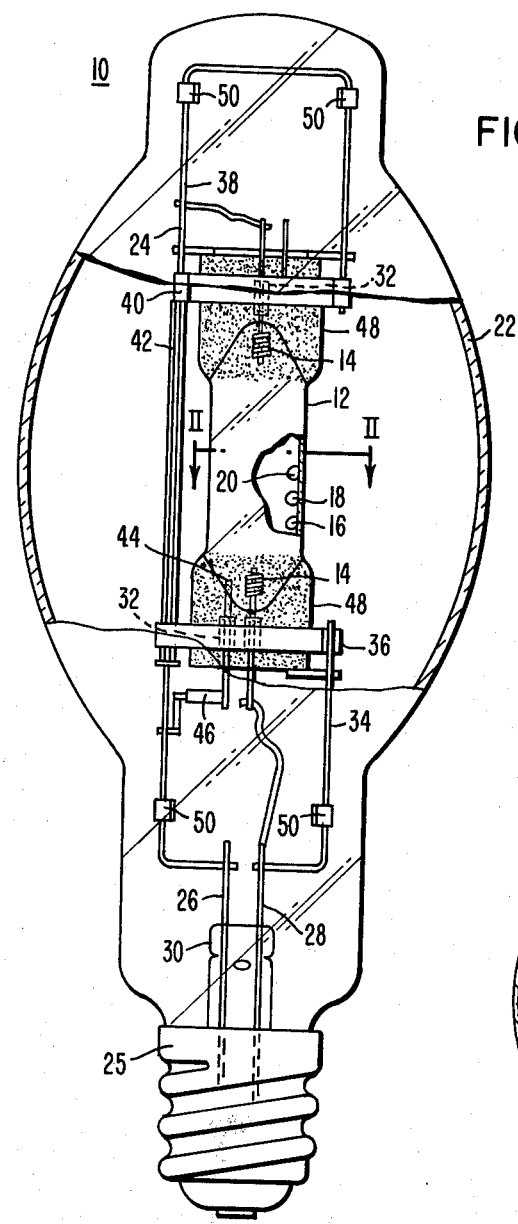
FIG. 1 is an elevational view, shown partly in section, of a mercury metal-halide HID lamp wherein the arc tube is provided with a thin transparent layer comprising boron oxide adhered to and reacted with the arc tube external surface to inhibit sodium ion migration through the arc tube during lamp operation.

With specific reference to the form of the invention illustrated in the drawings, the lamp 10 in FIG. 1 is a typical mercury metal-halide HID lamp comprising a radiation-transmitting vitreous silica arc tube 12 having electrodes 14 operatively positioned therein proximate the ends thereof and enclosing a discharge-sustaining filling comprising a predetermined charge of mercury 16 and inert ionizable starting gas plus sodium halide such as the iodide 18 and scandium halide such as the iodide 20. A light-transmitting outer envelope 22 surrounds the arc tube 12 and a suitable frame means 24 is provided for supporting the arc tube within the outer envelope 22. A suitable base means 25 is affixed to the outer envelope for connecting the lamp to a power source and lead-in conductor means 26, 28 are sealed through the outer envelope 22 by means of a conventional stem press 30 and also the arc tube 12 through suitable ribbon conductors 32, in order to electrically connect base 25 to the electrodes.

To complete the description of the generally conventional items comprising the lamp, the frame 24 includes a lower support portion 34 having an arc tube supporting strap 36 affixed thereto and an upper support portion 38 having a second strap 40 affixed thereto for supporting the other end of the arc tube. Electrical connection to the upper electrode 14 is made via an extension of the lead-in conductor 26 which has a glass sleeve 42 fitted thereover to limit electric fields which accentuate migration of sodium from the arc tube during the operation of the lamp. A starting electrode 44 is provided to ionize the gas within the arc tube during starting and once the discharge is initiated, a bimetal switch 46 electrically isolates the starting electrode 44. The ends of the arc tube are provided with a layer 48 of heat-conserving material such as finely divided zirconia. Leaf spring supports 50 affixed to the frame contact both the neck portion of the outer envelope 22 and the dome portion thereof to maintain the frame in position within the outer envelope 22.

Figure 2:
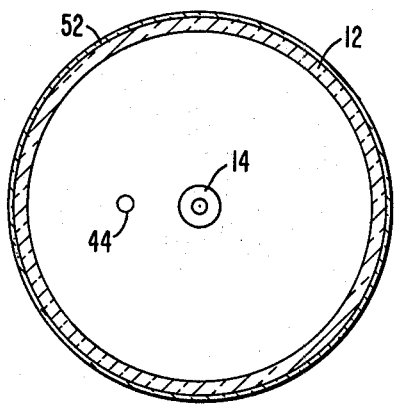
FIG. 2 is an enlarged sectional view of the arc tube taken on the line II—II in FIG. 1 showing the external coating comprising boron oxide.

In FIG. 2 is shown an enlarged sectional view of the arc tube 12 wherein the exterior surface thereof is provided with a thin transparent layer 52 comprising boron oxide which is adhered to and reacted with the arc tube exterior surface. This reacted layer comprising boron oxide substantially inhibits migration of sodium ions through the arc tube 12 during operation of the lamp 10, and the location of the reacted layer 52 comprising boron oxide on the exterior surface of the arc tube 12 protects the boron oxide from reaction with the highly reactive scandium halide which is enclosed by the arc tube 12.

The layer 52 comprising boron oxide can be applied by a variety of techniques but it preferably is applied by forming a partially hydrolyzed, aqueous, clear solution principally comprising boron alkoxide and silicon alkoxide wherein the molar ratio of silicon alkoxide to boron alkoxide is from 0.02 to 0.25. As a general rule, the total water solvent in the formed solution should be present in amount not to exceed 1.5 mol per mol of boron alkoxide plus 1 mol water per 0.25 mol of silicon alkoxide, in order that the solution will be clear and in a partially hydrolyzed state. The partially hydrolyzed clear solution can be applied to the exterior surface of the arc tube 12 after the arc tube is substantially fabricated, just prior to evacuation and dosing with the discharge-sustaining constituents. Such application can be achieved by a simple dipping or spraying process. When the arc tube is thereafter baked to remove impurities therefrom during the evacuation and the dosing process, the applied coating will be heated to a temperature of about 1100° C., which will liberate the hydroxyl and organic components from the applied solution and completely react the glass-forming residual constituents of the applied solution with the exterior surface of the arc tube. At the indicated temperature of 1100° C., the applied coating will rapidly complete its reaction with the surface of the arc tube. A typical baking time for the arc tube of twenty to thirty minutes in an air or nitrogen atmosphere will provide a completely reacted coating or layer comprising boron oxide. Thereafter, the lamp fabrication is completed in accordance with conventional practices, including applying the heat-conserving coating 48 to the end portions of the arc tube 12. The reacted layer comprising boron oxide will substantially inhibit the migration of sodium ions through the arc tube during operation of the lamp.

The foregoing procedure represents the preferred method of applying the coating comprising boron oxide, but if thicker coatings are desired, the arc tube can be directly rinsed or sprayed with an unhydrolyzed boron alkoxide, such as triethylborate. The wet surfaces are then exposed to ammonium hydroxide vapor which immediately forms a white frosty film which is loosely bonded boron oxide-hydroxide. When this is heat treated to about 300°–500° C., it turns clear and further heat treatment causes reaction with the substrate providing a stable boron oxide-silicon oxide surface.

Boron oxide without the addition of silica is quite unstable and hydrolyzes readily. If boron alkoxide in glycerin solution is applied directly to the vitreous silica substrate, very high temperatures such as 1200° C. to 1300° C. are required to completely react the boron oxide with the vitreous silica substrate. By forming the partially hydrolyzed clear solution of boron alkoxide and silicon alkoxide, there is some reaction in the solution between the silicon and the hydroxyl bonds of boron which forms —Si—O—B—O— bonds. A variation of this technique is to hydrolyze silicon alkoxide initially with insufficient water and then react the resultant ethoxysilanols with a boron alkoxide. As a specific example, 1 mol of triethylborate, $B(OC_2H_5)_3$ is hydrolyzed with 1.5 mols of water. The resulting boric oxide, hydrate slurry is then reacted with 15 grams of silicon tetraethoxide, $Si(OC_2H_5)_4$ which forms —Si—O—B—O— bonds. When the reaction is complete, the slurry becomes clear. The partially fabricated arc tube can be dipped in this clear liquid, excess liquid drained therefrom, and during the standard baking of the arc tube, the reaction with the silica substrate will be completed to form the adhered and reacted layer comprising boron oxide. The coating comprising boron oxide has stabilizing silica incorporated into its network while the coating precursors are in solution. In other coatings of this nature, silica is normally diffused into the boron oxide from silica substrates to which the coating is being applied, which requires very high-temperature heat treatment. For this reason, the present coating can even be applied to the inside surface of the arc tube, if desired, to provide a stable and completely reacted coated at relatively low heat-treatment temperatures. Since the reaction of the applied coating with the vitreous silica substrate can take place at much lower temperatures, such as about 500° C., the coating is readily applied to the arc tube after it has been dosed and substantially otherwise completed, prior to end coating and mounting in the outer envelope.

The coating comprising boron oxide can be modified by incorporating therein one or more of sodium oxide and potassium oxide, with the molar ratio of total sodium oxide plus potassium oxide to boron oxide in the reacted layer not exceeding about 0.1. The preferred additive is potassium oxide in such amount that the molar ratio of potassium oxide to boron oxide in the reacted layer is from about 0.05 to about 0.1.

The sodium and potassium are added to the coating solutions as soluble salts or organometallic compound, such as the acetate, in such amount that up to about 20 mol percent of the boron alkoxide is replaced by the sodium and potassium organometallic compound, with the atoms of boron in the replaced boron alkoxide approximating the total atoms of alkali metal in the replacing organometallic compound. These additives have the effect of stabilizing boron oxide and making it more reactive with the substrate.

The preferred molar ratio of silicon alkoxide to boron alkoxide is from about 0.03 to about 0.13. The preferred boron alkoxide is trimethylborate, although the higher alkoxides including tributylborate, can be substituted therefor. The preferred silicon alkoxide is silicon tetraethoxide although other silicon alkoxides and silanes such as tetramethyl silane or triethoxymethyl silane can be substituted therefor. While the foregoing solutions have good characteristics for coating glass surfaces, the coating characteristics of the solutions can be further improved in some cases by the addition of certain solvents, such as a small amount of glycol or alcohols, methanol being an example, into the liquid medium of the solutions.

While the present coatings on vitreous silica serve to substantially inhibit the diffusion of sodium atoms therethrough, these coatings also prevent the devitrification of any vitreous silica body. This normally occurs with the surface nucleation of cristobalite, which spreads and eventually destroys the mechanical integrity of the material. The preferred coatings are applied from a clear, partially hydrolyzed coating solution wherein the molar ratio of silicon alkoxide to boron alkoxide is from about 0.03 to about 0.13. For best protection against devitrification, from about 10 to about 20 mol percent of the boron alkoxide in the solution is replaced by potassium organometallic compound, such as the acetate, wherein the atoms of boron in the replaced boron alkoxide approximate the total atoms of alkali metal in the replacing organometallic compound. Such coatings as applied and heat treated at a temperature of approximately 1100° C. show a very high resistance with respect to devitrification, even at temperatures up to 1350° C. For example, coatings having a composition of 15 to 35 mol percent combined silica plus potassium oxide showed no surface devitrification even when maintained for 14 days at a temperature of 1350° C., the temperature at which uncoated vitreous silica devitrifies completely within a period of 24 hours. Thus, the present coating system has utility for the protection of any fused silica substrate from devitrification, or migration of sodium, or both.

What is claimed is:

1. The method of applying a thin transparent layer comprising boron oxide to the surface of a vitreous silica substrate, wherein the applied layer comprising boron oxide is adhered to and reacted with the surface of said substrate, said method comprising:
   a. forming a partially hydrolyzed aqueous clear solution principally comprising boron alkoxide and silicon alkoxide wherein the molar ratio of silicon alkoxide to boron alkoxide is from 0.02 to 0.25;
   b. applying the formed solution to the surface of the substrate to be coated; and
   c. heating the substrate and applied coating at a temperature of from about 500° C. to about 1100° C. for a sufficient time to liberate the hydroxyl and organic components from the applied solution and completely react the glass-forming residual constituents of said solution with the surface of said substrate.

2. The method as specified in claim 1, wherein the total water solvent in said formed solution is present in amount not to exceed 1.5 mol water per mol of boron alkoxide plus 1 mol water per 0.25 mol of silicon alkoxide.

3. The method as specified in claim 1, wherein said boron alkoxide in said solution is trimethylborate and said silicon alkoxide is silicon tetraethoxide.

4. The method of applying a thin transparent layer comprising boron oxide to the surface of a vitreous silica substrate, wherein the applied layer comprising boron oxide is adhered to and reacted with the surface of said substrate, said method comprising:
   a. forming a partially hydrolyzed aqueous clear solution principally comprising boron alkoxide and silicon alkoxide and alkali metal compound of at least one of soluble sodium or potassium organometallic compound, the amount of said alkali metal organometallic compound in said solution being determined by replacing up to about 20 mole percent of the boron alkoxide of a silicon alkoxide and boron alkoxide solution having a silicon alkoxide to boron alkoxide molar ratio of from 0.02 to 0.25 with said alkali metal organometallic compound, with the atoms of boron in said replaced boron alkoxide approximating the total atoms of alkali metal in said replacing organometallic compound;
   b. applying the formed solution to the surface of the substrate to be coated; and
   c. heating the substrate and applied coating at a temperature of from about 500° C. to about 1100° C. for a sufficient time to liberate the hydroxyl and organic components from the applied solution and completely react the glass-forming residual constituents of said solution with the surface of said substrate.

5. The method as specified in claim 4, wherein said alkali metal organometallic compound is potassium organometallic compound, the amount of said potassium organometallic compound in said solution is determined by relacing with said potassium organometallic compound from about 10 mole percent to about 20 mole percent of the boron alkoxide of a silicon alkoxide and boron alkoxide solution having a silicon alkoxide to boron alkoxide molar ratio of from about 0.03 to about 0.13, with the atoms of boron in said replaced boron alkoxide approximating the atoms of potassium in said replacing organometallic compound.

6. The method as specified in claim 5, wherein said potassium organometallic compound is potassium acetate.

* * * * *